US008229179B2

United States Patent
Sato

(10) Patent No.: US 8,229,179 B2
(45) Date of Patent: Jul. 24, 2012

(54) FINGER VEIN AUTHENTICATION APPARATUS AND FINGER VEIN AUTHENTICATION METHOD

(75) Inventor: Hideo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 490 days.

(21) Appl. No.: 12/567,442

(22) Filed: Sep. 25, 2009

(65) Prior Publication Data

US 2010/0080422 A1     Apr. 1, 2010

(30) Foreign Application Priority Data

Sep. 30, 2008  (JP) ............................... P2008-253969

(51) Int. Cl.
*G06K 9/00* (2006.01)

(52) U.S. Cl. .................. 382/115; 250/316.1; 702/135

(58) Field of Classification Search .......... 382/100, 382/115, 116, 124–128, 130, 131, 132; 128/922; 378/4–27; 705/64, 65, 67; 726/2, 4; 250/316.1, 250/330, 338.1, 339.14, 341.8, 342, 495.1; 702/40, 134, 135

See application file for complete search history.

(56) References Cited

U.S. PATENT DOCUMENTS

| | | | | |
|---|---|---|---|---|
| 5,594,806 | A * | 1/1997 | Colbert ....................... | 382/115 |
| 7,623,689 | B2 * | 11/2009 | Shigeta ....................... | 382/124 |
| 7,660,446 | B2 * | 2/2010 | Abe ............................. | 382/124 |
| 7,885,439 | B2 * | 2/2011 | Kato ........................... | 382/128 |
| 2005/0100200 | A1 * | 5/2005 | Abiko et al. ................. | 382/124 |
| 2007/0253607 | A1 * | 11/2007 | Higuchi ....................... | 382/124 |
| 2008/0031497 | A1 | 2/2008 | Kishigami et al. | |

FOREIGN PATENT DOCUMENTS

| | | |
|---|---|---|
| JP | 05-268521 | 10/1993 |
| JP | 2001-061109 | 3/2001 |
| JP | 2005-167484 | 6/2005 |
| JP | 2008-36058 | 2/2008 |
| JP | 2008-211514 | 9/2008 |

* cited by examiner

*Primary Examiner* — Anand Bhatnagar

(74) *Attorney, Agent, or Firm* — Finnegan, Henderson, Farabow, Garrett & Dunner, L.L.P.

(57) ABSTRACT

A finger vein authentication apparatus includes an image pickup device that creates two kinds of picked-up images by performing line scanning in both of a direction along a lengthwise direction of a finger and a direction orthogonal to the lengthwise direction of the finger, and an imaging range detection unit that detects a relative position of an imaging range of the finger by using at least one of a crease pattern near a first joint and a crease pattern near a second joint of the finger existing in at least one of two kinds of vein patterns.

7 Claims, 9 Drawing Sheets

CREASE PATTERN NEAR JOINT

CREASE PATTERN NEAR JOINT     CREASE PATTERN NEAR JOINT

FIG. 7
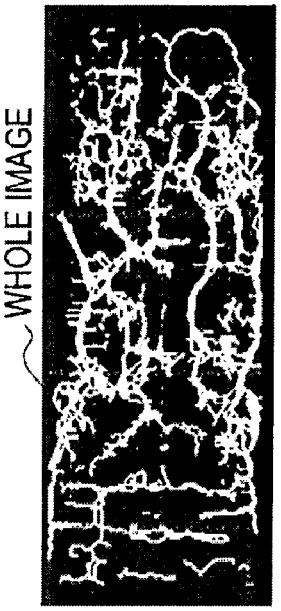
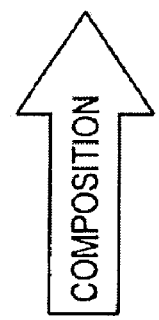
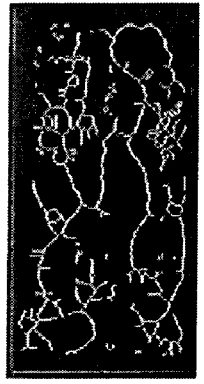
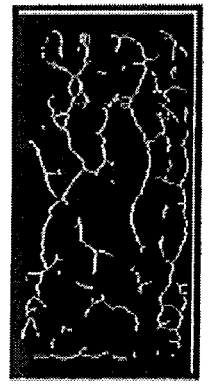
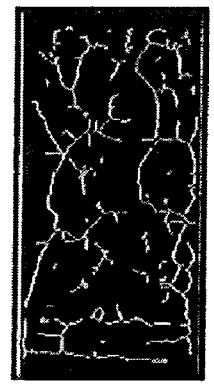
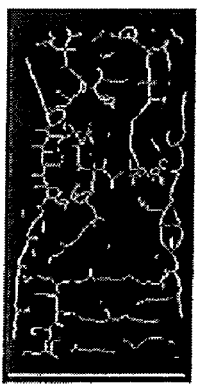

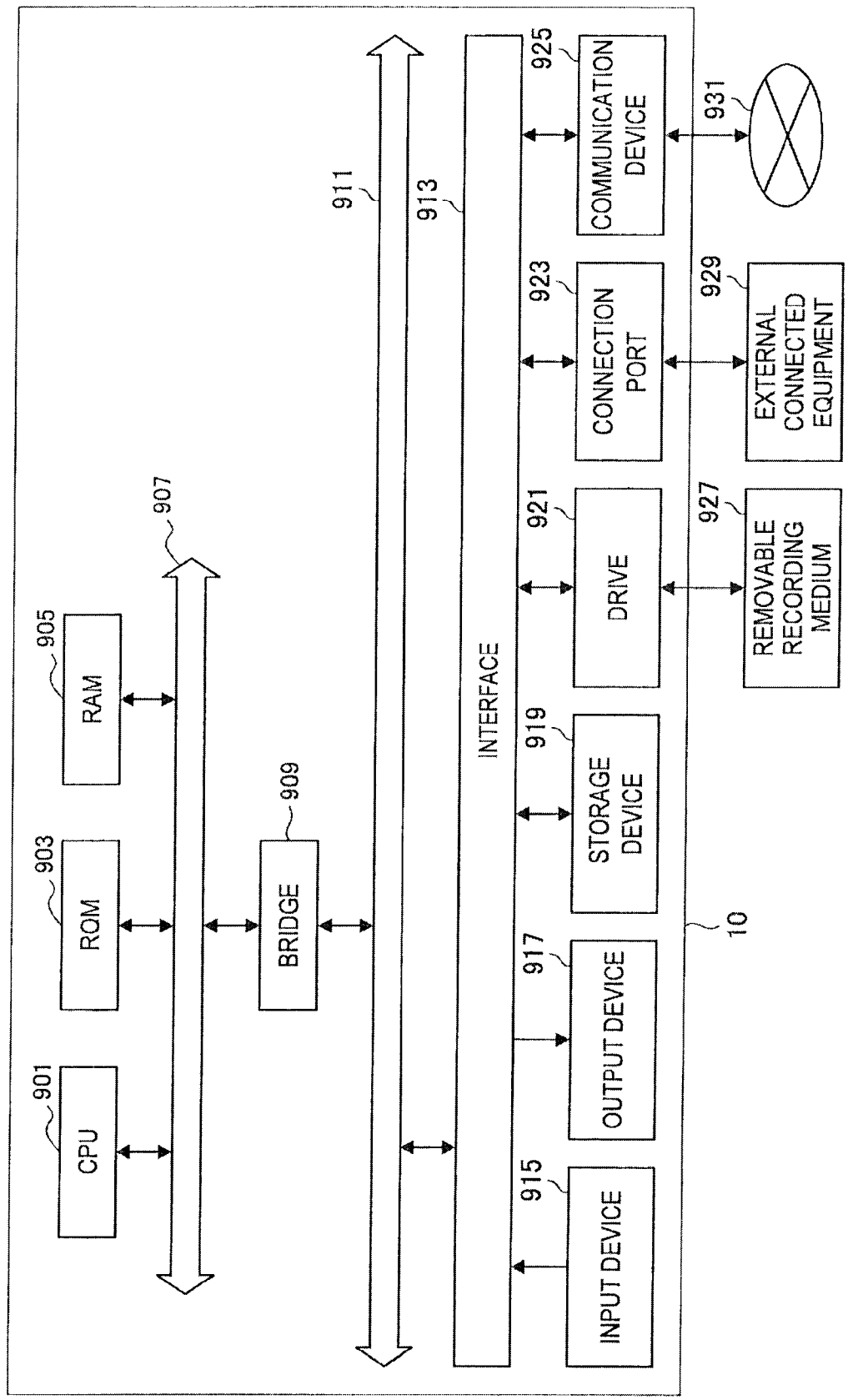

FINGER VEIN AUTHENTICATION APPARATUS AND FINGER VEIN AUTHENTICATION METHOD

BACKGROUND OF THE INVENTION

1. Field of the Invention

The present invention relates to a finger vein authentication apparatus and a finger vein authentication method.

2. Description of the Related Art

Biometric personal authentication is critically important technology for safeguarding the rights in the future network society. Particularly, in Internet commercial transactions where theft of money, contents, rights or the like via Internet is possible by means of spoofing by a third party, the biometric personal authentication attracts attention as technology for safeguarding the area that is insoluble with cryptograph only. Fingerprint or iris authentication, however, has the issue of forgery remaining unsolved. On the other hand, personal authentication technology that uses a vein pattern in a part which is difficult to be imaged from the outside is expected to be next-generation biometric personal authentication for its high verification accuracy and high difficulty of forgery or spoofing.

Examples of such biometric personal authentication technology are fingerprint authentication technology and vein authentication technology. While the fingerprint authentication technology has a problem in the existence of unregisterable users (about 4%), resistance to spoofing attacks using a residual fingerprint or the like, it has an advantage of reducing a sensor size because it allows easy image composition with a scan type using a line sensor, an area sensor or the like. On the other hand, the vein authentication technology, which is expected to be next-generation authentication technology having less problem, has been difficult to be mounted on mobile equipment or the like due to a large sensor, and, particularly, it has been difficult to form a device in a planar structure in an imaging scheme that uses a vein transmitted image due to a strict restriction on the position of a light source.

In order to achieve size reduction of a device using the vein authentication technology, Japanese Unexamined Patent Publication No. 2008-36058 discloses a technique of using a microlens array in which microlenses are arranged in an array.

SUMMARY OF THE INVENTION

In a finger vein authentication apparatus according to related art, acquisition of finger position information, deletion of an unnecessary part, positional registration and so on are performed with use of auxiliary information different from vein information which is obtained by detection of the outer shape of a finger or the like. On the other hand, in an apparatus using a microlens array that enables size reduction of apparatus, it is difficult to acquire a whole image of a finger because of the reduced apparatus size, and therefore another method for positional registration, elimination of false information or the like is necessary as an alternative to the detection of the outer shape of a finger.

In light of the foregoing, it is desirable to provide a novel and improved finger vein authentication apparatus and finger vein authentication method capable of specifying a relative position of an imaged finger in spite of using a microlens array where acquisition of a whole image of a finger is difficult.

According to an embodiment of the present invention, there is provided a finger vein authentication apparatus that includes a lens array including a plurality of photo-receiving lenses arranged in an array, a plurality of near-infrared illumination sources placed along opposed ends of the lens array to illuminate a part of a finger with near-infrared light, an image pickup device to create a picked-up image of a vein based on the near-infrared light scattered inside the finger, transmitted through the vein and gathered by the lens array, the image pickup device creating two kinds of picked-up images by performing line scanning in both of a first direction along an alignment direction of the near-infrared illumination sources and a second direction orthogonal to the first direction and along a lengthwise direction of the finger, a vein pattern extraction unit to extract vein patterns respectively from the two kinds of picked-up images, an authentication unit to authenticate the extracted two kinds of vein patterns, and an imaging range detection unit to detect a relative position of an imaging range of the finger by using at least one of a crease pattern near a first joint and a crease pattern near a second joint of the finger existing in at least one of the two kinds of vein patterns.

In this configuration, the plurality of photo-receiving lenses are arranged in an array in the lens array, and the plurality of near-infrared illumination sources that illuminate a part of a living body with near-infrared light are placed along the opposed ends of the lens array. The image pickup device creates a picked-up image of a vein based on the near-infrared light that has been scattered inside the living body, transmitted through the vein and gathered by the lens array, and it creates two kinds of picked-up images by performing line scanning in both of the first direction along an alignment direction of the near-infrared illumination sources and the second direction orthogonal to the first direction and along the lengthwise direction of the finger. The vein pattern extraction unit extracts vein patterns respectively from the two kinds of picked-up images, and the authentication unit authenticates the extracted two kinds of vein patterns. Further, the imaging range detection unit detects the relative position of the imaging range of the finger by using at least one of the crease pattern near the first joint and the crease pattern near the second joint of the finger, which exists in at least one of the two kinds of vein patterns.

It is preferred that the finger vein authentication apparatus further includes a storage unit to store a vein information set including a plurality of vein patterns as a template, and the authentication unit selects the vein pattern from the vein information set by using at least one of the crease pattern near the first joint and the crease pattern near the second joint.

The authentication unit preferably creates a whole image of finger veins by combining the plurality of vein patterns and registering the whole image of finger veins as the template upon registration of the vein pattern, and specifies a part imaged in the vein pattern upon authentication by using at least one of the crease pattern near the first joint and the crease pattern near the second joint.

The authentication unit may additionally register an intersection between the crease pattern near the first joint or the crease pattern near the second joint and the vein pattern as a feature point.

A plurality of photoreceptors in the image pickup device may be allocated to one photo-receiving lens, and the finger vein authentication apparatus may further include a parallax information acquisition unit to acquire information about parallax when imaging a part of the finger by using a plurality of kinds of imaging data obtained by imaging a part of the same finger with use of the plurality of photoreceptors, and an outer shape detection unit to detect an outer shape of the finger by using the parallax information.

According to another embodiment of the present invention, there is provided a finger vein authentication method that includes the steps of illuminating a part of a finger with near-infrared light, gathering the near-infrared light scattered inside the finger and transmitted through a vein by a lens array including a plurality of photo-receiving lenses arranged in an array, creating two kinds of picked-up images by imaging the near-infrared light scattered inside the finger, transmitted through the vein and gathered by the lens array with use of an image pickup device that performs line scanning in both of a direction along a lengthwise direction of the finger and a direction orthogonal to the lengthwise direction of the finger, extracting vein patterns respectively from the two kinds of picked-up images, detecting a relative position of an imaging range of the finger by using at least one of a crease pattern near a first joint and a crease pattern near a second joint of the finger existing in at least one of the two kinds of vein patterns, and authenticating the extracted two kinds of vein patterns.

According to another embodiment of the present invention, there is provided a finger vein authentication apparatus that includes a lens array including a plurality of photo-receiving lenses arranged in an array, a plurality of near-infrared illumination sources placed along opposed ends of the lens array to illuminate a part of a finger with near-infrared light, an image pickup device to create a picked-up image of a vein based on the near-infrared light scattered inside the finger, transmitted through the vein and gathered by the lens array, the image pickup device creating a picked-up image by performing line scanning in at least one of a first direction along an alignment direction of the near-infrared illumination sources and a second direction orthogonal to the first direction and along a lengthwise direction of the finger, a vein pattern extraction unit to extract a vein pattern from the picked-up image, an authentication unit to authenticate the extracted vein pattern, and an imaging range detection unit to detect a relative position of an imaging range of the finger by using at least one of a crease pattern near a first joint and a crease pattern near a second joint of the finger extracted from the vein pattern.

According to the embodiments of the present invention described above, it is possible to specify a relative position of an imaged finger in spite of using a microlens array where acquisition of a whole image of a finger is difficult.

BRIEF DESCRIPTION OF THE DRAWINGS

FIG. 7 is an explanatory view to describe composition processing of vein patterns.

FIG. 9 is a block diagram to describe a hardware configuration of a finger vein authentication apparatus according to an embodiment of the present invention.

DETAILED DESCRIPTION OF THE INVENTION

Figure 1:
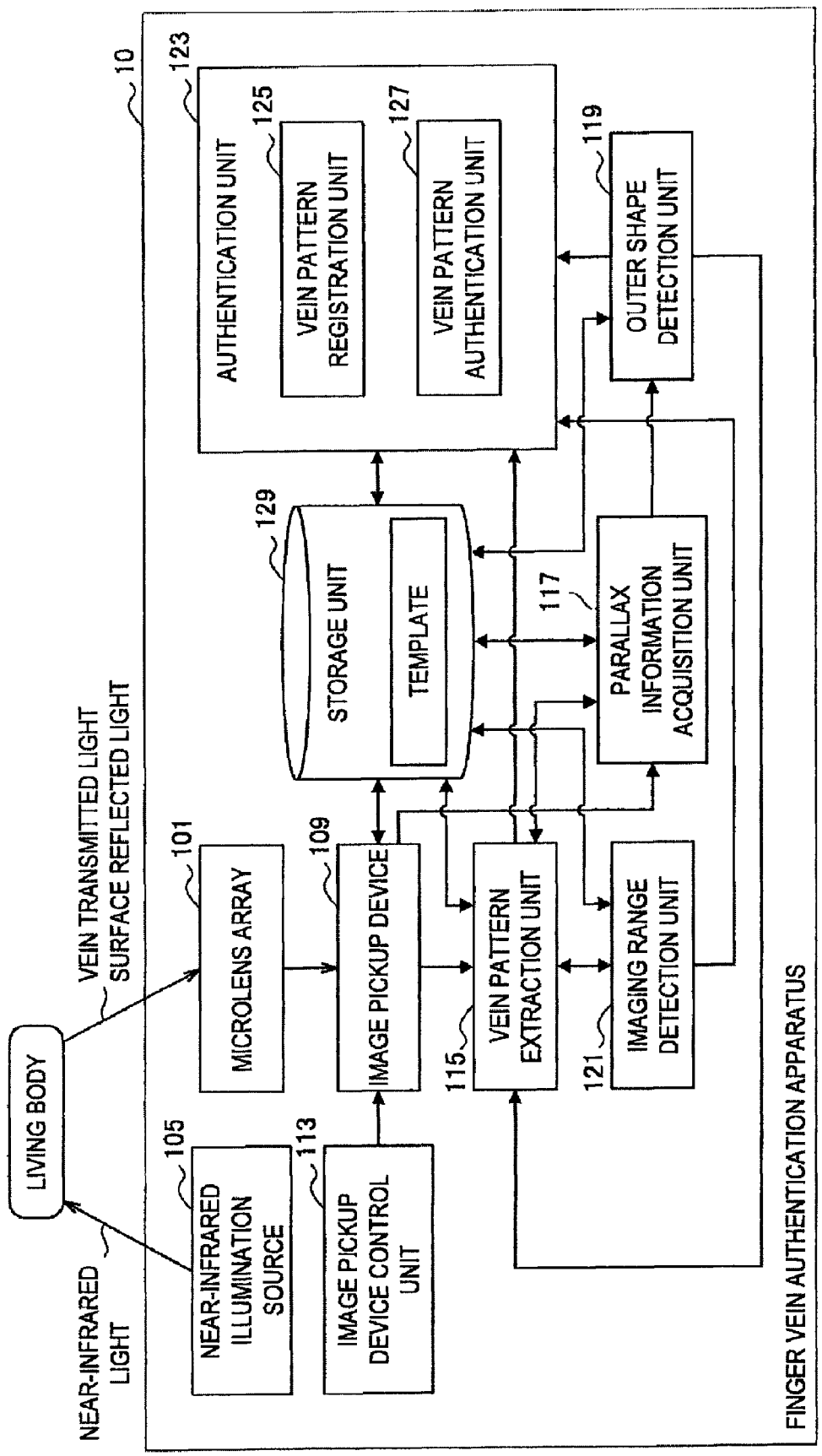
FIG. 1 is a block diagram showing a configuration of a finger vein authentication apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
(1) First Embodiment
(1-1) Configuration of a finger vein authentication apparatus
(1-2) Finger vein authentication method
(2) Hardware configuration of a finger vein authentication apparatus according to an embodiment of the present invention.
(3) Summary The inventor of the present invention has conducted studies in order to overcome the above-described issue and reached the following findings. In a vein authentication apparatus according to related art, it has been difficult to pick up an image of fine veins such as finger veins unless an imaging apparatus and an illumination apparatus are placed apart at a certain distance. This is because near-infrared light entering a finger is largely scattered by a living body. It is generally considered that 70% or higher percentage of near-infrared light entering a living body reaches only a dermis layer, and therefore light emitted from an imaging apparatus becomes reflected light to the dermis layer, and the contrast of a fine vein image that is a shadow by absorption of scattered light from the backside decreases significantly by the interference of the reflected light, which makes imaging difficult. Due to such a reason, a vein authentication apparatus according to related art can be used only for thick blood vessels of the palm, the back of hands and so on.

A vein authentication apparatus according to an embodiment of the present invention is an apparatus composed of a flat sensor using a microlens array and an integral-type illumination apparatus placed on the periphery of a panel. In an embodiment of the present invention, a directivity control plate or an aperture that is disposed to selectively extract light is placed in each of a microlens array and a light source, thereby enabling selective imaging of light from the backside of veins. Integration of a light source and a sensor, which has been considered to be impossible in a hitherto known optical system, is thereby achieved.

The flat sensor can perform imaging of a finger vein with higher quality and better reproducibility than a hitherto known optical system, such as less image distortion, no change in enlargement ratio and clear imaging of venule, and it is therefore possible to maintain an authentication accuracy even if an imaging area is made smaller than a vein authentication apparatus according to related art.

In a finger vein authentication apparatus according to related art, acquisition of finger position information, deletion of an unnecessary part, positional registration and so on are performed by using auxiliary information different from vein information, such as finger guide or outer shape detection. Therefore, in a flat sensor that enables size reduction of apparatus, another method for positional registration, elimination of false information or the like is necessary as an alternative thereto.

First Embodiment

Configuration of a Finger Vein Authentication Apparatus

Figure 2:
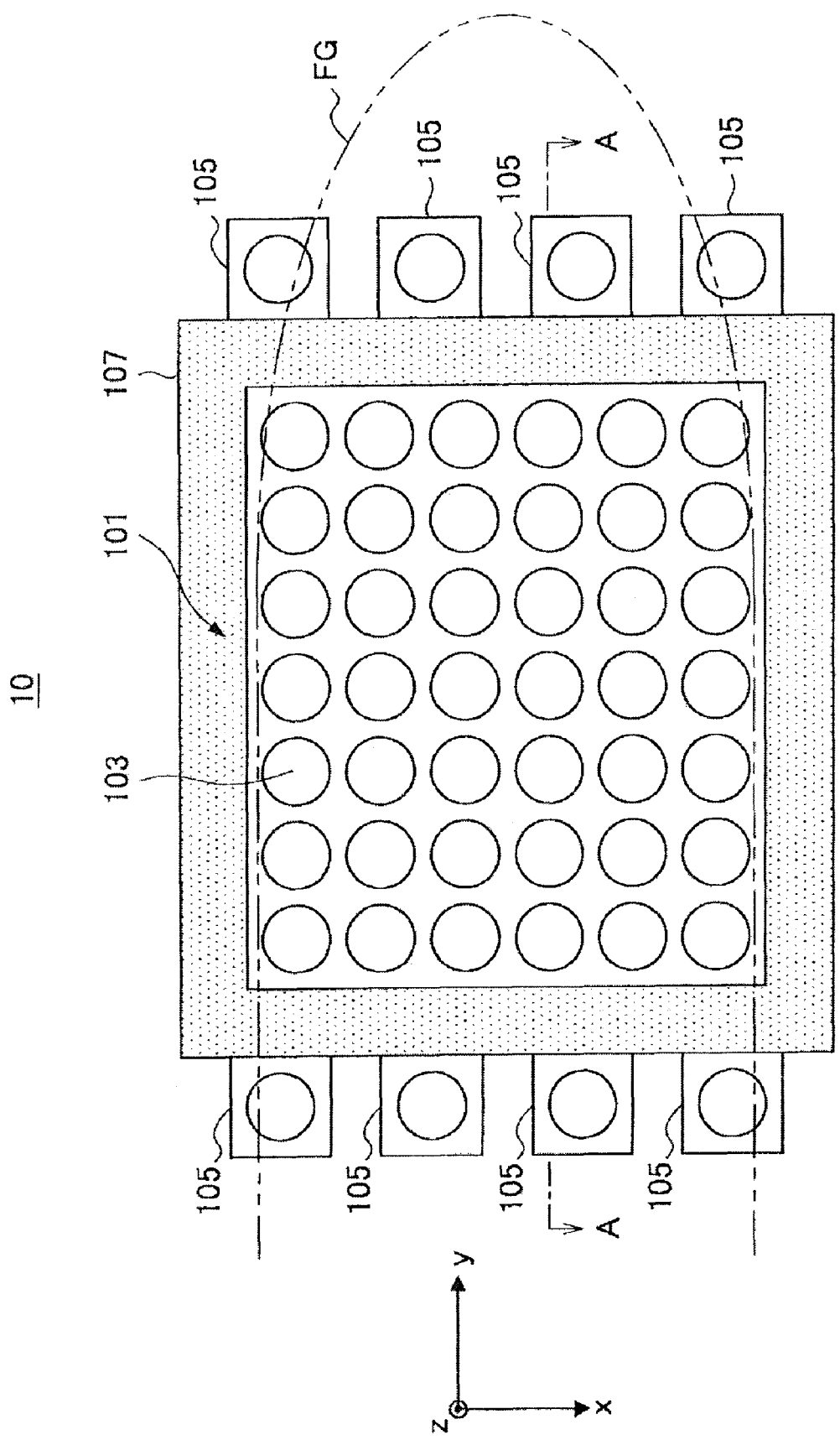
FIG. 2 is a plan view to describe an imaging unit of the finger vein authentication apparatus according to the embodiment.
Figure 3:
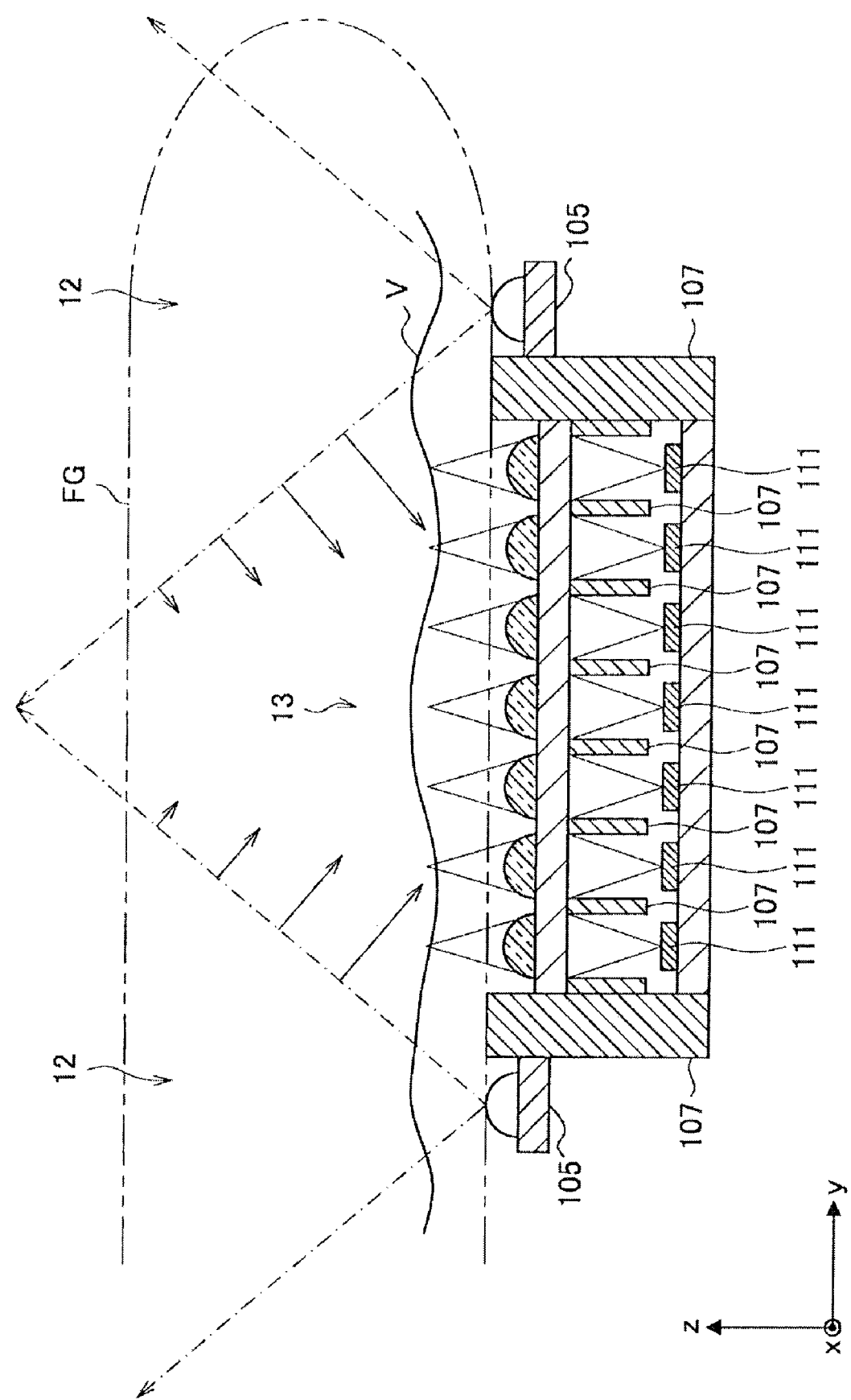
FIG. 3 is a sectional view along line A-A in FIG. 2.

A configuration of a finger vein authentication apparatus according to a first embodiment of the present invention is described hereinafter in detail with reference to FIGS. 1 to 3. FIG. 1 is a block diagram showing a configuration of a finger vein authentication apparatus according to the embodiment. FIG. 2 is a plan view to describe an imaging unit in the finger vein authentication apparatus according to the embodiment. FIG. 3 is a sectional view along line A-A in FIG. 2.

A finger vein authentication apparatus 10 according to the embodiment mainly includes a microlens array 101, a near-infrared illumination source 105, an image pickup device 109, an image pickup device control unit 113, a vein pattern extraction unit 115, a parallax information acquisition unit 117, an outer shape detection unit 119, an imaging range detection unit 121, an authentication unit 123 and a storage unit 129 as shown in FIG. 1, for example. The finger vein authentication apparatus 10 picks up an image of a part of a living body (e.g. a finger) that is placed on the apparatus and creates a picked-up image of a vein existing inside the finger (i.e. a vein image) and further performs authentication processing of the created vein image.

The microlens array (MLA) 101 gathers near-infrared light that is emitted from the near-infrared illumination source 105, which is described later, to a part of a living body (e.g. a finger) and transmitted through a vein inside the living body (which is also referred to hereinafter as vein transmitted light) onto the image pickup device 109, which is described later. The microlens array 101 is composed of a plurality of photo-receiving lenses as described later.

The near-infrared illumination source 105 illuminates a part of a living body placed on the finger vein authentication apparatus 10 with near-infrared light in a prescribed wavelength band. Because the near-infrared light has characteristics that it is well transmitted through body tissues and absorbed by hemoglobin (reduced hemoglobin) in blood, if the near-infrared light is illuminated on the finger, palm or back of a hand, veins distributed inside the finger, palm or back of the hand appear as a shadow in an image. The shadow of veins that appears in an image is called a vein pattern. In order to suitably pick up an image of the vein pattern, the near-infrared illumination source 105 emits near-infrared light having a wavelength of about 600 nm to 1300 nm or, preferably, about 700 nm to 900 nm.

If the wavelength of the near-infrared light emitted from the near-infrared illumination source 105 is less than 600 nm or more than 1300 nm, the percentage of light that is absorbed by hemoglobin in blood decreases, and it becomes difficult to obtain a suitable vein pattern. On the other hand, if the wavelength of the near-infrared light emitted from the near-infrared illumination source 105 is about 700 nm to 900 nm, the near-infrared light is specifically absorbed by both deoxygenated hemoglobin and oxygenated hemoglobin, and it is therefore possible to obtain a suitable vein pattern.

As the near-infrared illumination source 105, a light emitting diode (LED) may be used, for example. Further, in stead of using a light emitting diode in the above wavelength band, a combination of a light emitting diode capable of emitting light containing the above wavelength band and a filter for optically limiting the band of emitted light may be used.

The image pickup device 109 has an image pickup surface on which a plurality of photoreceptors 111 are arranged in a lattice structure, and creates a vein image by near-infrared light based on the vein transmitted light that is focused by the microlens array 101. As the image pickup device 109 according to the embodiment, a charge coupled device (CCD) image sensor, a complementary metal-oxide semiconductor (CMOS) image sensor or the like may be used. The image pickup device 109 outputs the created vein image (which is also referred to hereinafter as imaging data) to the vein pattern extraction unit 115 and the parallax information acquisition unit 117. Further, the image pickup device 109 may store the created vein image into the storage unit 129, which is described later.

In the finger vein authentication apparatus 10 according to the embodiment, a plurality of photoreceptors 111 are allocated to one photo-receiving lens of the microlens array 101 as described later. Thus, in the finger vein authentication apparatus 10 according to the embodiment, the near-infrared light (vein transmitted light) that is gathered by one photo-receiving lens is imaged by a plurality of photoreceptors 111.

The timing of scanning photoreceptors or the like in the image pickup device 109 is controlled by the image pickup device control unit 113, which is described later.

The image pickup device control unit 113 is composed of a central processing unit (CPU), read only memory (ROM), random access memory (RAM) or the like, for example, and controls driving of the image pickup device 109. Specifically, the image pickup device control unit 113 controls the scan timing of the photoreceptor 111 constituting the image pickup device 109, the selection of the photoreceptor 111 from which information is to be acquired and so on based on a prescribed synchronizing signal or the like.

Specifically, the image pickup device control unit 113 controls the image pickup device 109 in such a way that the image pickup device 109 performs line scanning respectively in the direction along the lengthwise direction of a finger placed on the finger vein authentication apparatus 10 and in the direction orthogonal to the lengthwise direction of a finger. By controlling the image pickup device 109 in such a way, it is possible to generate two kinds of imaging data: image data containing a crease pattern existing near the first joint of a finger and a crease pattern existing near the second joint of a finger and imaging data not containing such a crease pattern, as described later.

If the image pickup device 109 is compatible with the line scanning of either one of the direction along the lengthwise direction of a finger or the direction orthogonal to the lengthwise direction of a finger, the image pickup device control unit 113 may control the image pickup device 109 to perform scanning in the direction where the line scanning is possible.

The vein pattern extraction unit 115 is composed of a CPU, ROM, RAM or the like, for example, and extracts vein patterns from two kinds of imaging data generated by the image pickup device 109.

The vein pattern extraction unit 115 first performs image reversal processing and composition processing based on the imaging data transferred from the image pickup device 109. As described earlier, the near-infrared light gathered by one photo-receiving lens of the microlens array 101 is imaged by the plurality of photoreceptors 111. In each of the plurality of photoreceptors 111 corresponding to one photo-receiving lens, an image in which the up and down and the left and right are respectively reversed from an original image is created, as described later. It is therefore possible to perform the processing of reversing and combining the respective images created by the photoreceptors 111.

By combining the reversed and composite images obtained from all photo-receiving lenses, imaging data having a resolution that is necessary for vein authentication processing is obtained.

The extraction of a vein pattern is performed by applying a differential filter to the above-described imaging data. The differential filter is a filter that outputs a large value as an output value at a part where a difference between a pixel of interest and a peripheral pixel is large. In other words, the differential filter is a filter that enhances a line or an edge in an image by an operation using a difference in tone between a pixel of interest and its periphery.

Generally, if filtering is performed using a filter h(x, y) on image data u(x, y) with a lattice point (x, y) on a two-dimensional plane as a variable, image data v(x, y) is generated as represented by the following Expression 1. In Expression 1, "*" indicates convolution integral.

$$v(x, y) = u(x, y) * h(x, y)$$ Expression 1

$$= \sum_{m_1}\sum_{m_2} h(m_1, m_2) u(x - m_1, y - m_2)$$

$$= \sum_{m_1}\sum_{m_2} u(m_1, m_2) h(x - m_1, y - m_2)$$

In the extraction of a vein pattern in this embodiment, a differentiation filter such as a primary space differentiation filter or a secondary space differentiation filter may be used as the above-described differential filter. The primary space differentiation filter is a filter that calculates a difference in tone between a pixel of interest and an adjacent pixel in the horizontal direction and the vertical direction, and a secondary space differentiation filter is a filter that extracts a part where the amount of change in difference in tone is large in a pixel of interest.

As the secondary space differentiation filter, the following Laplacian of Gaussian (LOG) filter may be used. The LOG filter (Expression 3) is represented by a second order derivative of a Gaussian filter (Expression 2), which is a smoothing filter using the Gaussian function. In the following Expression 2, a indicates a standard deviation of the Gaussian function, which is a variable indicating the degree of smoothing of the Gaussian filter. Further, a in the following Expression 3 is a parameter indicating a standard deviation of the Gaussian function as in Expression 2, and an output value when performing LOG filtering can be changed by changing a value of σ.

$$h_{gauss}(x, y) = \frac{1}{2\pi\sigma^2} \exp\left\{-\frac{(x^2 + y^2)}{2\sigma^2}\right\}$$ Expression 2

$$h_{Log}(x, y) = \nabla^2 \cdot h_{gauss}(x, y)$$ Expression 3

$$= \left(\frac{\partial^2}{\partial x^2} + \frac{\partial^2}{\partial y^2}\right) h_{gauss}$$

$$= \frac{(x^2 + y^2 - 2\sigma^2)}{2\pi\sigma^6} \exp\left\{-\frac{(x^2 + y^2)}{2\sigma^2}\right\}$$

On the vein pattern that is extracted in the above manner, threshold processing, binarization processing, thinning processing or the like, which is processing to be performed on a picked-up image after applying the differential filter, for example, is performed. After such processing, a skeleton of the vein pattern can be extracted.

The vein pattern extraction unit 115 transfers the vein pattern that is extracted in the above manner to the imaging range detection unit 121 and the authentication unit 123, which are described later.

Further, the vein pattern extraction unit 115 may use a detection result of an outer shape that is obtained from the outer shape detection unit 119, which is described later, for the extraction processing of a vein pattern.

The vein pattern extraction unit 115 may store the extracted vein pattern or skeleton into the storage unit 129, which is described later. The vein pattern extraction unit 115 may further store a parameter generated upon performing each processing, the progress of processing or the like into the storage unit 129.

In the case where the image pickup device control unit 113 conducts the line scanning of the image pickup device 109 in one direction only, the vein pattern extraction unit 115 extracts the vein pattern from the obtained one kind of picked-up image by using the above method.

The parallax information acquisition unit 117 is composed of a CPU, ROM, RAM or the like, for example, and acquires information about parallax when picking up an image of a part of a finger, which is an imaging target, based on the imaging data that is transferred from the image pickup device 109.

As described above, the plurality of photoreceptors 111 are associated with each of the photo-receiving lenses constituting the microlens array 101, and the plurality of photoreceptors 111 that correspond to one photo-receiving lens pick up images of the same imaging target from slightly different directions. Therefore, the images obtained by the photoreceptors 111 are differentiated for edge detection, and the obtained edge part is analyzed. Information about parallax is thereby obtained as a displacement of a focal position on the image, for example, and a separation distance between the photoreceptor 111 and the imaging target can be calculated. A method of acquiring the information about parallax is described in detail later.

The parallax information acquisition unit 117 transfers the obtained information about parallax (e.g. information about a separation distance between a photoreceptor and an imaging target) to the outer shape detection unit 119, which is described later. Further, the parallax information acquisition unit 117 may store the obtained information about parallax into the storage unit 129, which is described later.

The outer shape detection unit 119 is composed of a CPU, ROM, RAM or the like, for example, and detects the outer shape of an imaging target based on the information about parallax that is transferred from the parallax information acquisition unit 117. Because a finger, which is an imaging target, actually has a depth, positions where the above-described separation distance differs exist in the vicinity of the outline of the finger. Therefore, the outer shape detection unit 119 can detect the outer shape, i.e. obtain information about the outline of the finger by using the parallax information (specifically information about a separation distance) of a plurality of images transferred from the parallax information acquisition unit 117.

Specifically, the outer shape detection unit 119 determines a part where the separation distance is largely apart as being an unnecessary part such as the outline of a finger or the outside of a finger, and a part where the separation distance is proximate as being a part corresponding to a finger.

The outer shape detection unit 119 outputs the detection result of the outer shape to the vein pattern extraction unit 115 and the authentication unit 123 for use in processing by each processing unit. Further, the outer shape detection unit 119 may store the obtained information about the outer shape into the storage unit 129, which is described later.

The imaging range detection unit 121 is composed of a CPU, ROM, RAM or the like, for example, and detects to which part of a finger the transferred vein pattern or the like corresponds based on the vein pattern, skeleton or the like that is transferred from the vein pattern extraction unit 115.

Specifically, the imaging range detection unit 121 detects an imaging range by using the vein pattern or the like that is extracted from the imaging data obtained by performing the line scanning in the direction orthogonal to the lengthwise direction of a finger which is transferred from the vein pattern extraction unit 115. Hereinafter, the lengthwise direction of a finger is referred to as the vertical direction, and the direction orthogonal to the lengthwise direction of a finger is referred to as the horizontal direction.

As described later, the imaging data that is obtained by performing the line scanning in the horizontal direction contains crease patterns existing in the vicinity of the first joint and the second joint of a finger. By comparing such characteristic crease patterns, an intersection between a crease pattern and a vein pattern, the shape of a vein pattern, the position of an outline or the like with a template that is registered in advance, it is possible to broadly specify the imaging range of the vein pattern. When performing the detection of the imaging range, the imaging range detection unit 121 may refer to various kinds of parameters, databases, programs or the like that are stored in the storage unit 129, which is described later.

The imaging range detection unit 121 outputs the obtained information about an imaging range (e.g. information such as a crease pattern or how remote from the outline the part corresponding to the data is) to the authentication unit 123. Further, the imaging range detection unit 121 may store the obtained information about an imaging range into the storage unit 129, which is described later.

The authentication unit 123 is composed of a CPU, ROM, RAM or the like, for example, and registers the vein pattern generated by the vein pattern extraction unit 115 as a template and checks the vein pattern generated by the vein pattern extraction unit 115 against the registered template and thereby authenticates the vein pattern. The authentication unit 123 includes a vein pattern registration unit 125 and a vein pattern authentication unit 127, for example.

The vein pattern registration unit 125 registers the vein pattern generated by the vein pattern extraction unit 115 as a template onto the storage unit 129, which is described later. When registering the vein pattern, other data that identifies a person who has the vein pattern (e.g. fingerprint data, face image data, iris data, voice print data etc.) may be also stored in association with the vein pattern. Further, the vein pattern to be registered as a template may contain header information conforming to the Common Biometric Exchange File Format (CBEFF) or the like, for example.

Further, the vein pattern registration unit 125 may additionally register an intersection between the crease pattern near the first joint or the crease pattern near the second joint and the vein pattern as a feature point.

The vein pattern registration unit 125 may combine a plurality of vein patterns that are transferred from the vein pattern extraction unit 115 and record them as one whole image. The composition of the whole image is described later.

The vein pattern authentication unit 127 authenticates the generated vein pattern based on the vein pattern that is generated by the vein pattern extraction unit 115 and the template of the vein pattern that has been registered. The vein pattern authentication unit 127 requests the storage unit 129, which is described later, to disclose the registered vein pattern and compares the acquired registered vein pattern with the vein pattern transferred from the vein pattern extraction unit 115.

Specifically, the vein pattern authentication unit 127 grasps a positional relationship of the transferred vein pattern with respect to the registered vein pattern (template) based on the information about an outer shape and the information about an imaging range that are transferred from the vein pattern authentication unit 127, the outer shape detection unit 119 and the imaging range detection unit 121, and thereby compares the transferred vein pattern with the registered vein pattern.

The comparison between the registered vein pattern and the transferred vein pattern can be executed based on a correlation coefficient, which is calculated as follows, for example. As a result of the comparison, if the registered vein pattern and the transferred vein pattern are similar, the vein pattern authentication unit 127 authenticates the transferred vein pattern, and if they are not similar, the vein pattern authentication unit 127 does not authenticate the transferred vein pattern.

The correlation coefficient is defined by the following Expression 4, and it is a statistical indicator that indicates a similarity between two data x={xi} and y={yi}, which is a real value from −1 to 1. If the correlation coefficient indicates a value close to 1, it means that the two data are similar, and if the correlation coefficient indicates a value close to 0, it means that the two data are not similar. Further, if the correlation coefficient indicates a value close to −1, it means that the signs of the two data are reversed.

$$r = \frac{\sum_i (x_i - \bar{x})(y_i - \bar{y})}{\sqrt{\sum_i (x_i - \bar{x})^2} \sqrt{\sum_i (y_i - \bar{y})^2}} \qquad \text{Expression 4}$$

$\bar{x}$: Average value of data $x$ $\bar{y}$: Average value of data $y$

The vein pattern authentication unit 127 may store the authentication result in association with an authentication time or the like as an authentication history into the storage unit 129. By generating the authentication history, it is possible to know by whom and when vein pattern authentication is requested, and by whom and when the finger vein authentication apparatus 10 is used.

Further, the vein pattern authentication unit 127 may divide the registered vein pattern into several patterns in advance based on those crease patterns and use them for processing.

The vein pattern authentication unit 127 may further use a dermatoglyphic pattern as represented by the above-described crease patterns. By performing so-called multimodal authentication with use of both the dermatoglyphic pattern and the vein pattern, the accuracy of authentication increases.

The storage unit 129 stores a vein pattern that is requested to be registered from the vein pattern registration unit 125 and other data associated with the registered vein pattern. In addition to those data, a vein image created by the image pickup device 109, a vein pattern extracted by the vein pattern extraction unit 115 and so on may be stored. Further, various parameters or progress of processing that are necessary to be stored while the finger vein authentication apparatus 10 performs certain processing, various kinds of databases and so on may be stored according to need. Data may be freely written to or read from the storage unit 129 by the image pickup device 109, the image pickup device control unit 113, the vein pattern extraction unit 115, the parallax information acquisition unit 117, the outer shape detection unit 119, the imaging range detection unit 121, the authentication unit 123 and so on.

[Structure of a Vein Imaging Unit]

A structure of an imaging unit in the finger vein authentication apparatus according to the embodiment is described hereinafter in detail with reference to FIGS. 2 and 3.

The microlens array 101 of the finger vein authentication apparatus 10 according to the embodiment is made up of a plurality of microlenses 103, which are photo-receiving lenses, and the microlenses 103 are arranged in a lattice structure on a given substrate as shown in FIG. 2, for example. Each microlens 103 guides vein transmitted light that enters the microlens 103 through a plane of incidence to the image pickup device 109 (specifically, the photoreceptor 111 of the image pickup device 109), which is described later, as shown in FIG. 3, for example. The microlens array 101 is a lens array with a small curvature of field and with no distortion in the depth direction, and therefore suitable image data can be obtained by using the microlens array 101. The focal position of each microlens 103 forming the microlens array 101 is set to be the position of a vein layer where a vein V exists, which is an imaging target of the finger vein authentication apparatus 10.

Human skin is known to have a three-layer structure including an epidermis layer, a dermis layer and a subcutaneous tissue layer, and the above-described vein layer exists in the dermis layer. The dermis layer is located at about 0.1 mm to 0.3 mm below the finger surface and has a thickness of about 2 mm to 3 mm. Thus, by setting the focal position of the microlens 103 at the existing position of the dermis layer (e.g. the position that is about 1.5 mm to 2.0 mm below the finger surface), it is possible to efficiently gather the light transmitted through the vein layer.

It is known that about 70% of the near-infrared light emitted from the near-infrared illumination source 105 is reflected by the epidermis layer. The epidermis layer is a part that is relevant to a crease pattern of skin (so-called a dermatoglyphic pattern). Even if the focal length is set as above, the microlens array gathers the light reflected by the epidermis layer. The finger vein authentication apparatus 10 according to the embodiment utilizes the dermatoglyphic pattern (i.e. the fingerprint pattern) that is obtained by the light reflected by the epidermis layer as well.

The number of the microlenses 103 in the microlens array 101 according to the embodiment is not limited to the example shown in FIG. 2. The number of the microlenses 103 in the microlens array 101 according to the embodiment may be set arbitrarily according to the size of a living body to be imaged, the size of the image pickup device 109 or the like.

A plurality of light emitting diodes, which are an example of the near-infrared illumination source 105, are placed at the opposed ends of the microlens array 101 as shown in FIG. 2, for example. The ends where the light emitting diodes are placed are preferably the ends corresponding to the upper end and the lower end of a part of a living body (which is a finger FG in the example shown in FIGS. 2 and 3). By placing the light emitting diodes in this manner, it is possible to apply the near-infrared light from the top and the bottom of the finger FG.

The number of the near-infrared illumination sources 105 according to the embodiment is not limited to the example shown in FIG. 2, and it may be set arbitrarily according to the size of the microlens array 101, an illumination area of the near-infrared illumination sources 105 or the like.

Further, a directivity control plate 107 is placed between the microlens array 101 and the near-infrared illumination source 105 as shown in FIGS. 2 and 3, for example. The directivity control plate 107 controls the directivity of direct light 12 that is emitted from the near-infrared illumination sources 105 in such a way that the direct light 12 does not directly enter the microlenses 103 of the microlens array 101.

The near-infrared light that is emitted from the near-infrared illumination sources 105 propagates upward to the surface of the finger FG and enters the finger FG as the direct light 12 as shown in FIG. 3, for example. Because a human body is a suitable scatterer of near-infrared light, the direct light 12 that has entered the finger FG is scattered in all directions while propagating. A part of such scattered light travels as rear scattered light 13 through the above-described vein layer from the backside to the finger surface, and passes through the vein V on its way. The vein transmitted light that has passed through the vein enters the respective microlenses 103 forming the microlens array 101.

The directivity control plate 107 is placed at the boundary between the adjacent microlenses 103. The directivity control plate 107 enables control of the directivity of the vein transmitted light, thereby allowing selection of the vein transmitted light to be focused on the image pickup device 109 (specifically, the photoreceptor 111).

Although only one photoreceptor 111 corresponds to one microlenses 103 in the illustration of FIG. 3, a plurality of photoreceptors 111 correspond to one microlenses 103 in practice, as described later.

[Scanning Direction of an Image Pickup Device]

Figure 4A:
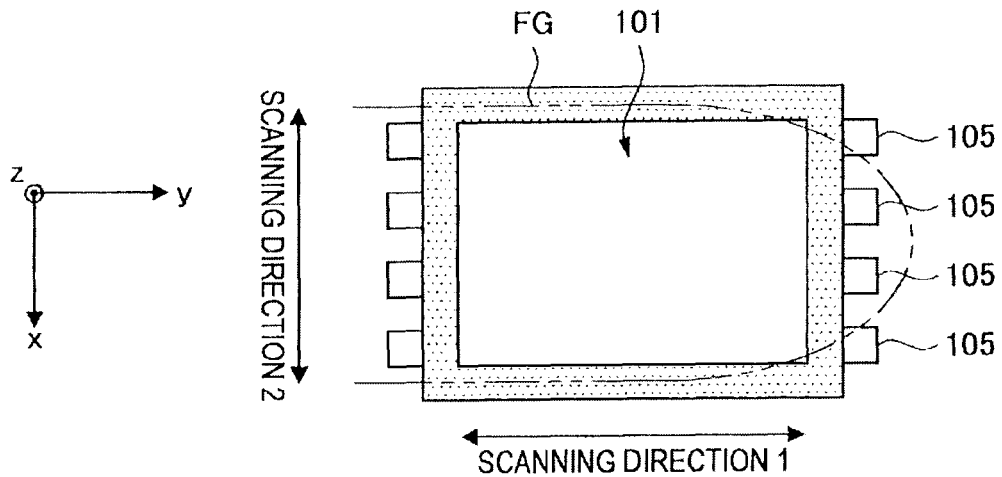
FIG. 4A is an explanatory view to describe a scanning direction of an image pickup device included in the finger vein authentication apparatus according to the embodiment.
Figure 4B:
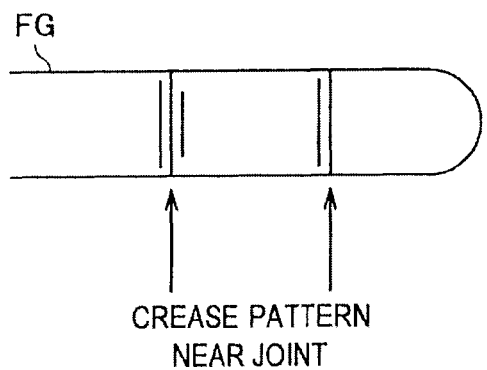
FIG. 4B is an explanatory view to describe a scanning direction of an image pickup device included in the finger vein authentication apparatus according to the embodiment.
Figure 4C:
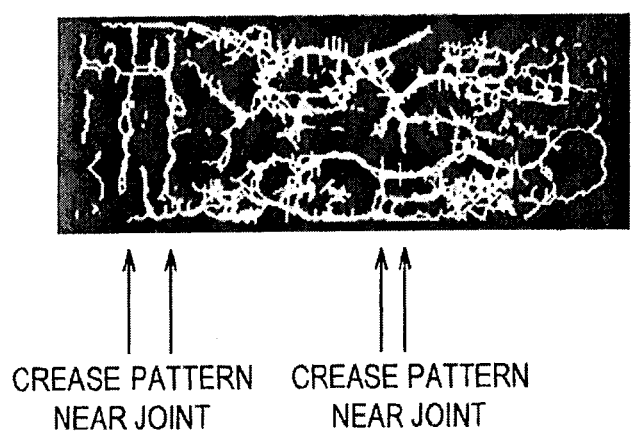
FIG. 4C is an explanatory view to describe a scanning direction of an image pickup device included in the finger vein authentication apparatus according to the embodiment.

The scanning direction of the image pickup device 109 that is included in the finger vein authentication apparatus 10 according to the embodiment is described hereinafter in detail with reference to FIGS. 4A to 4C. FIGS. 4A to 4C are explanatory views to describe the scanning direction of the image pickup device included in the finger vein authentication apparatus according to the embodiment.

The microlens array 101 that is included in the finger vein authentication apparatus 10 according to the embodiment has the structure as shown in FIGS. 2 and 4A, for example, and the image pickup device 109 is placed below the microlens array 101. The image pickup device 109 is controlled by the image pickup device control unit 113 so as to perform the line scanning in the two scanning directions shown n FIG. 4A.

As schematically shown in FIG. 4B, the human finger FG has characteristic crease patterns near the first joint and the second joint. Further, about 70% of the near-infrared light that is applied to the finger is reflected by the epidermis layer where such a crease pattern exists and then gathered by the microlens array as described earlier. Therefore, the crease pattern as shown in FIG. 4B remains in an obtained image in a certain scanning direction of the image pickup device.

In a vein authentication method according to related art, in order to eliminate the remaining crease pattern as shown in FIG. 4B, the image pickup device performs the line scanning along the "scanning direction 1" shown in FIG. 4A. The direction of the line scanning is thereby substantially parallel to the direction of the crease pattern shown in FIG. 4B, which allows elimination of the remaining crease pattern.

On the other hand, because the crease pattern near the joint as shown in FIG. 4B is utilized for specifying the imaging range in the finger vein authentication apparatus 10 according to the embodiment, the image pickup device 109 performs the line scanning along both the "scanning direction 1" and the "scanning direction 2" as shown in FIG. 4A.

In the imaging data that is obtained by performing the line scanning along the scanning direction 1 (i.e. the vertical direction), a vein pattern where the crease pattern as shown in FIG. 4B hardly remains can be obtained, so that the vein pattern to be used for vein authentication processing can be extracted.

On the other hand, in the imaging data that is obtained by performing the line scanning along the scanning direction 2 (i.e. the horizontal direction), the direction of the crease pattern as shown in FIG. 4B and the scanning direction are orthogonal to each other, so that a vein pattern where the crease pattern remains can be obtained as shown in FIG. 4C.

In this manner, by performing the line scanning in the two scanning directions in the finger vein authentication apparatus 10 according to the embodiment, it is possible to obtain both the vein pattern to be used for specifying the imaging range of the vein pattern and the vein pattern to be used for authentication processing.

Because it is necessary to acquire the crease pattern near the joint as described above, the microlens array 101 and the image pickup device 109 are preferably large enough to capture an image of both the first joint and the second joint of a finger.

Other than the above-described method, the following method may be used, for example. As shown in FIG. 4B, for example, the direction of a crease existing near the joint is substantially orthogonal to the lengthwise direction of a finger (i.e. the vertical direction). Thus, by performing the line scanning along either one scanning direction of the vertical direction or the horizontal direction and then performing image processing on the obtained image with use of a directional filter or the like, it is possible to separate and extract a crease pattern from a vein pattern.

[Method of Acquiring Parallax Information]

Figure 5A:
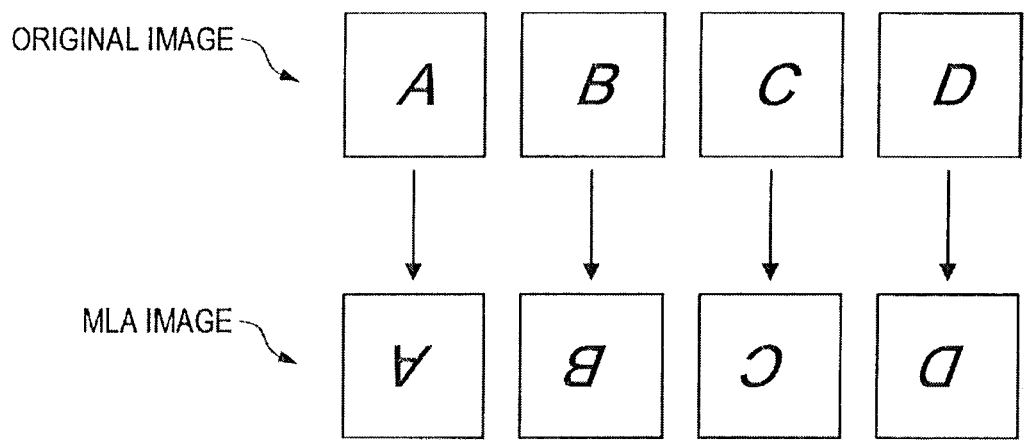
FIG. 5A is an explanatory view to describe an image captured by a microlens array.
Figure 5B:
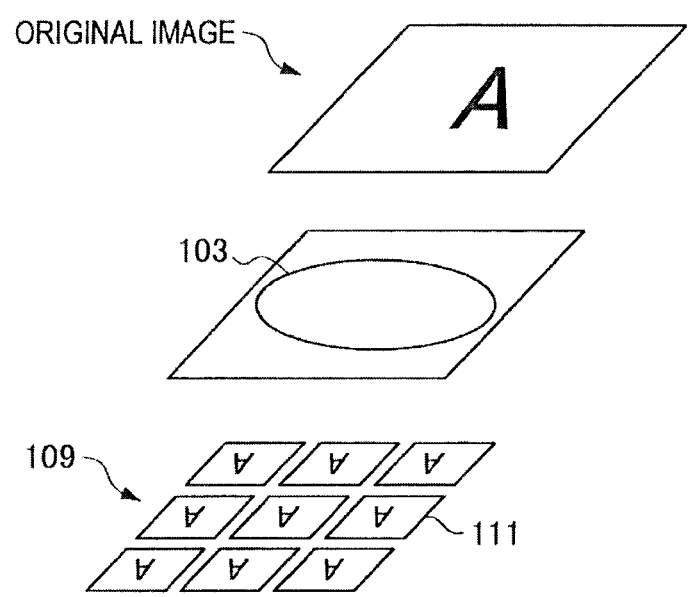
FIG. 5B is an explanatory view to describe an image captured by a microlens array.
Figure 6:
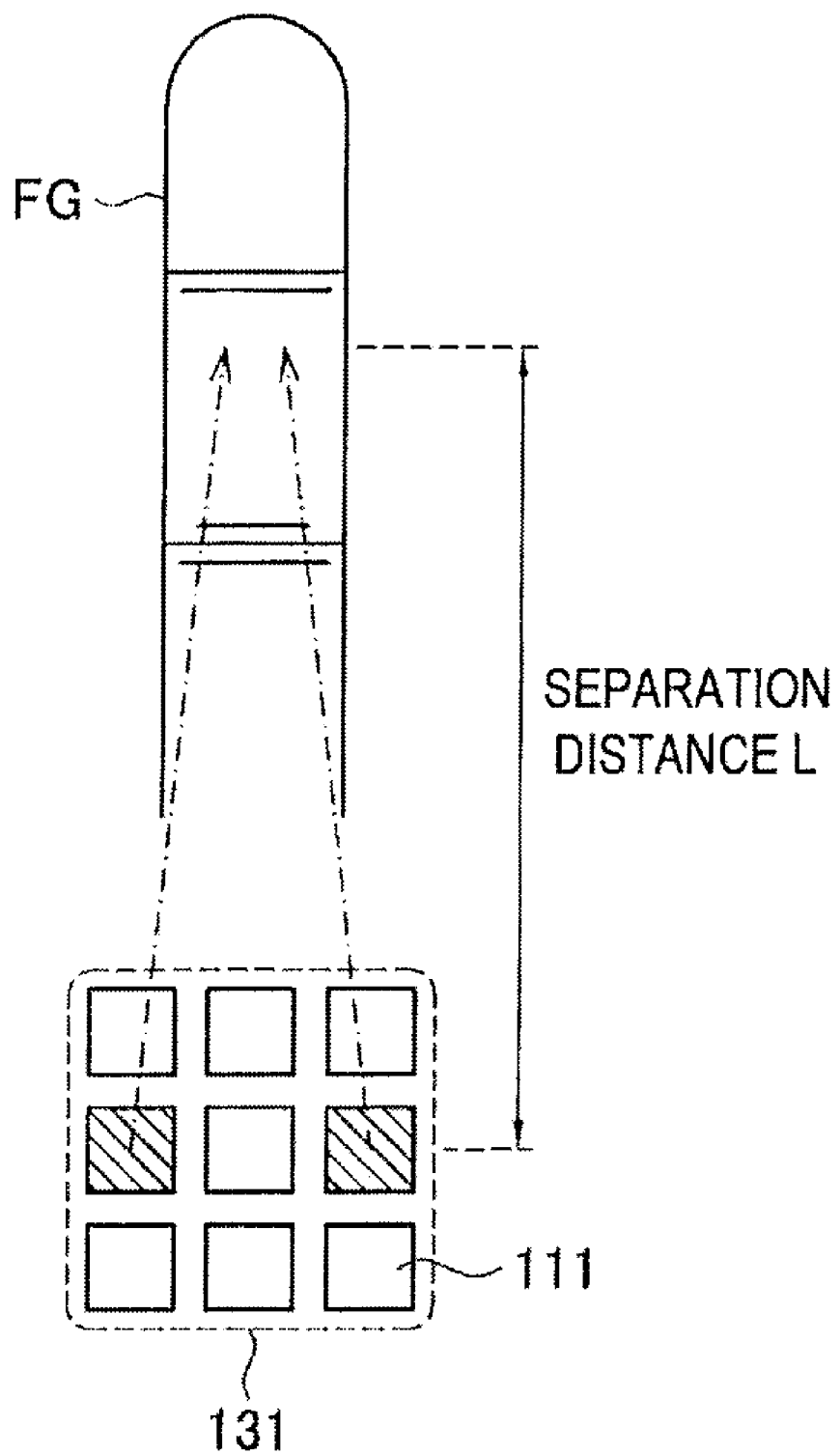
FIG. 6 is an explanatory view to describe parallax information obtained by using a microlens array.

A method of acquiring parallax information is described hereinafter in detail with reference to FIGS. 5A to 6. FIGS. 5A and 5B are explanatory views to describe an image that is picked up by a microlens array. FIG. 6 is an explanatory view to describe parallax information obtained by using a microlens array.

Generally, if a certain image is picked up by using a microlens array (MLA), a picked-up image is such that the up and down and the left and right are respectively reversed from an original image as shown in FIG. 5A, for example. Further, because a plurality of photoreceptors 111 are allocated to one photo-receiving lens (microlens 103) in practice, an image in which the up and down and the left and right are reversed is created for all the photoreceptors 111 that is allocated to one microlens 103. For example, if nine (3×3) photoreceptors 111 are allocated to one microlens 103 as shown in FIG. 5B, an image in which the up and down and the left and right are reversed is created for each of the nine photoreceptors 111.

Therefore, in an imaging apparatus using a microlens array, reversal processing is first performed on all images that are obtained from the photoreceptors 111 allocated to one microlens 103 to thereby change the up-and-down relationship and the left-and-right relationship back to the original state, and then the respective images are combined to increase the resolution of the image.

Consider, for example, the case where a certain part of a finger is imaged by using one microlens 103 as shown in FIG. 6. It is assumed in this case that nine (3×3) photoreceptors 111 are allocated to one microlens 103 as shown in FIG. 6. A group made up of nine photoreceptors shown in FIG. 6 is referred to hereinafter as a "unit group 131".

As shown in FIG. 5B, the same image is formed in the state where the up and down and the left and right are reversed on the photoreceptors 111 corresponding to one microlens 103. However, because the direction from each photoreceptor 111 to an imaging target differs depending on the position of the photoreceptor 111 in the unit group 131 in practice, the imaging data obtained from the photoreceptors 111 constituting the unit group 131 contain parallax.

Focusing attention on the photoreceptors 111 at the same horizontal position in the unit group 131, such as the two photoreceptors 111 which are diagonally shaded in FIG. 6, the imaging data obtained from the photoreceptors 111 are expected to be data where the conditions other than the imaging direction are substantially the same. Therefore, by analyzing the imaging data obtained from the photoreceptors 111 in such a positional relationship, the parallax information acquisition unit 117 according to the embodiment can acquire parallax information.

Specifically, the parallax information acquisition unit 117 performs differentiation of the imaging data obtained from the photoreceptors 111 in the positional relationship as shown in FIG. 6 for edge detection and then performs comparison about a part that is recognized as an edge. For example, the parallax information acquisition unit 117 grasps the position in each imaging data where an identical point of an imaging target is located and then calculates a separation distance L by using information related to a positional relationship of the photoreceptors 111 in the unit group 131.

Although the case of focusing attention on the two photoreceptors 111 located on the same line is described in the foregoing, parallax information may be acquired by using the photoreceptors 111 that are not located on the same line. However, because timing of transferring a signal that is output from the photoreceptor 111 or the like can differ in the photoreceptors 111 that are not located on the same line, real-time processing is not performed in some cases. In such a case, it is necessary to acquire parallax information by storing the information acquired from the photoreceptors 111 once into frame memory or the like and then relocating the information acquired from the photoreceptors 111.

[Method of Acquiring a Whole Image of Vein Patterns]

Composition processing of vein patterns that is performed by the authentication unit 123 is described hereinafter in detail with reference to FIG. 7. FIG. 7 is an explanatory view to describe composition processing of vein patterns.

In the finger vein authentication apparatus 10 according to the embodiment, the line scanning of a finger, which is an imaging target, is performed along two directions: the scanning direction 1 and the scanning direction 2. A flat sensor using the microlens array 101 has characteristics that distortion does not occur by a slight difference in distance when scanning a finger in two directions: the horizontal direction and the vertical direction.

Therefore, it is possible to perform the line scanning of a finger, which is an imaging target, along two scanning directions and then combine a plurality of vein patterns extracted from obtained images to thereby create one whole image as shown in FIG. 7.

In a set of a plurality of vein patterns that are acquired by different scanning directions (which is referred to hereinafter as a vein information set), a common part exists as a result of comparing the vein patterns. Because the finger vein authentication apparatus 10 according to the embodiment can specify an imaging range by using crease patterns existing near the first joint and the second joint, it is possible to determine which vein pattern is connected to which vein pattern with respect to each vein pattern constituting the vein information set. Further, with respect to a common part as well, it is possible to find a range with a high similarity by using the above-described correlation coefficient.

Thus, the vein pattern registration unit 125 according to the embodiment can combine a plurality of vein patterns that constitute the vein information set based on the information about an imaging range and the information about a similarity and thereby obtain the whole image as shown in FIG. 7.

By registering the whole image as a template, it is possible to compare a partial vein pattern that is input for authentication with the whole image.

An example of the function of the finger vein authentication apparatus 10 according to the embodiment is described in the foregoing. Each of the above-described elements may be configured using a general-purpose member or circuit, or it may be configured by hardware specialized to the function of each element. Further, the function of each element may be entirely realized by a CPU or the like. It is thereby possible to change the configuration to use as appropriate according to the technique level when implementing the embodiment.

The finger vein authentication apparatus 10 according to the embodiment may be mounted on various kinds of apparatus like an information processing apparatus such as a computer or a server, a mobile terminal such as a cellular phone or a PHS or a portable information terminal (PDA), an automated-teller machine (ATM), an access management apparatus, a game machine, a controller of a game machine or the like.

Although the case where the registered vein pattern that is registered as a template is stored within the finger vein authentication apparatus 10 is described in the foregoing, the registered vein pattern may be stored in a recording medium such as a DVD medium, an HD-DVD medium, a Blu-ray medium, a compact flash (registered trademark), a memory stick or an SD memory card, an IC card or an electronic device incorporating a contactless IC chip or the like, or may be stored in a server that is connected to the finger vein authentication apparatus 10 through a communication network such as Internet.

<Finger Vein Authentication Method>

Figure 8:
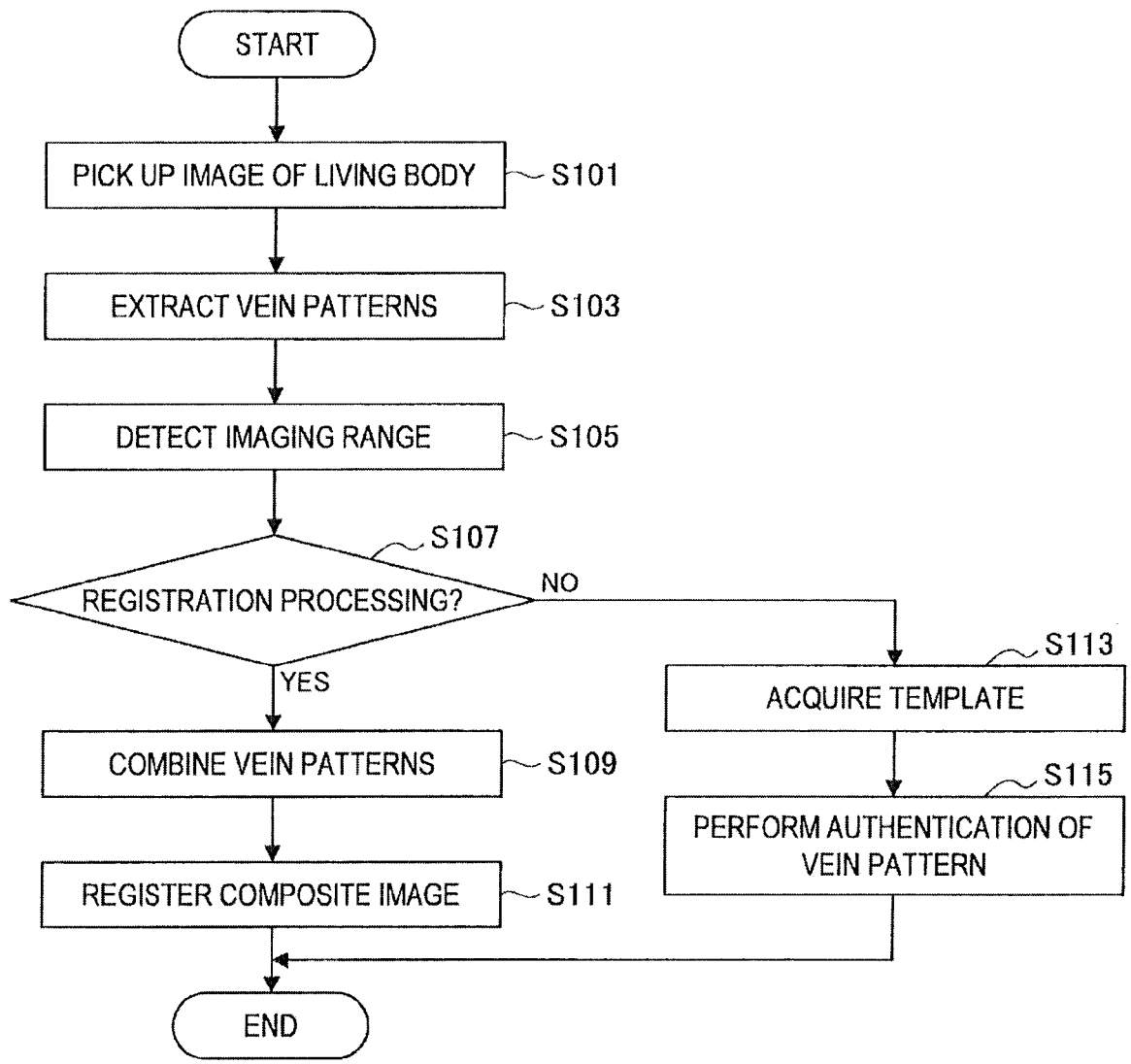
FIG. 8 is a flowchart to describe a finger vein authentication method according to the embodiment.

A finger vein authentication method according to the embodiment is described hereinafter with reference to FIG. 8. FIG. 8 is a flowchart to describe a finger vein authentication method according to the embodiment.

In the finger vein authentication method according to the embodiment, the near-infrared illumination source 105 illuminates a part of a finger with near-infrared light, and the microlens array 101 and the image pickup device 109 pick up an image of a living body (Step S101).

In this step, the image pickup device 109, which is controlled by the image pickup device control unit 113, performs both the line scanning along the lengthwise direction of a finger (the line scanning along the vertical direction) and the line scanning along the direction orthogonal to the lengthwise direction of a finger (the line scanning along the horizontal direction) and thereby generates two kinds of imaging data.

The generated two kinds of imaging data are transferred to the vein pattern extraction unit 115, and the vein pattern extraction unit 115 extracts vein patterns from the respective imaging data (Step S103). The vein pattern extraction unit 115 transfers the extracted two kinds of vein patterns to the imaging range detection unit 121 and the authentication unit 123.

Along with the extraction processing of vein patterns, the parallax information acquisition unit 117, which has acquired the imaging data from the image pickup device 109, may perform acquisition processing of parallax information. The parallax information acquisition unit 117 transfers the acquired parallax information to the outer shape detection unit 119, and the outer shape detection unit 119 acquires information about the outer shape of a finger (e.g. information about an outline etc.). The outer shape detection unit 119 can transfer the acquired information about the outer shape to the vein pattern extraction unit 115 and the authentication unit 123.

If the processing executed by the finger vein authentication apparatus 10 is registration processing of a finger vein (Step S107), the vein pattern registration unit 125 of the authentication unit 123 combines the plurality of vein patterns transferred from the vein pattern extraction unit 115 based on information transferred from the imaging range detection unit 121 or the like and create a composite image (Step S109). After the composite image creation processing is completed, the vein pattern registration unit 125 registers the composite image as template into the storage unit 129 (Step S111).

On the other hand, if the processing executed by the finger vein authentication apparatus 10 is authentication processing of a finger vein (Step S107), the vein pattern authentication unit 127 of the authentication unit 123 acquires the template registered in the storage unit 129 (Step S113) and starts authentication. Specifically, the vein pattern authentication unit 127 determines to which part of the composite image the vein pattern to be authenticated corresponds based on the information transferred from the imaging range detection unit 121. The determination processing is performed based on a separation distance from a crease pattern near the first joint or a crease pattern near the second joint, a similarity of correlation coefficient or the like.

After determining to which part of the whole image the vein pattern corresponds, the vein pattern authentication unit 127 performs comparison between the corresponding part of the registered template and the transferred vein pattern (Step S115). If the transferred vein pattern is similar to the corresponding part of the registered template, the vein pattern authentication unit 127 determines that authentication is succeeded and executes processing on which a limitation for execution is placed. If, on the other hand, the transferred vein pattern is not similar to the corresponding part of the registered template, the vein pattern authentication unit 127 determines that authentication is failed and ends the processing, indicating an error.

As described in the foregoing, the finger vein authentication method according to the embodiment can specify a relative position of a vein pattern by utilizing a crease pattern existing near the joint even with use of an apparatus where it is difficult to obtain information of a whole finger such as a flat panel using a microlens array.

<Hardware Configuration>

A hardware configuration of the finger vein authentication apparatus 10 according to an embodiment of the present invention is described hereinafter with reference to FIG. 9. FIG. 9 is a block diagram to describe a hardware configuration of the finger vein authentication apparatus 10 according to an embodiment of the present invention.

The finger vein authentication apparatus 10 mainly includes a CPU 901, ROM 903, RAM 905, a host bus 907, a bridge 909, an external bus 911, an interface 913, an input device 915, an output device 917, a storage device 919, a drive 921, a connection port 923, and a communication device 925.

The CPU 901 serves as a processing unit and a control unit, and it controls the whole or a part of operation in the finger vein authentication apparatus 10 according to programs stored in the ROM 903, the RAM 905, the storage device 919 or a removable recording medium 927. The ROM 903 stores a program to be used by the CPU 901, a processing parameter and so on. The RAM 905 primarily stores a program to be used in the execution on the CPU 901, a parameter that varies during the execution and so on. The CPU 901, the ROM 903 and the RAM 905 are connected with one another through the host bus 907, which is an internal bus such as a CPU bus.

The host bus 907 is connected to the external bus 911 such as a Peripheral Component Interconnect/Interface (PCI) bus via the bridge 909.

The input device 915 is an operating means to be operated by a user, such as a mouse, a keyboard, a touch panel, a button, a switch or a lever, for example. The input device 915 may be a remote controlling means (or a remote control) using an infrared ray or another radio wave, or an external connected equipment 929 compatible with the operation of the finger vein authentication apparatus 10, such as a cellular phone or a PDA. Further, the input device 915 is configured by an input control circuit that generates an input signal based on information input by a user using the above operating means and outputs it to the CPU 901, for example. A user of the finger vein authentication apparatus 10 manipulates the input device 915 to thereby input various kinds of data or direct a processing operation to the finger vein authentication apparatus 10.

The output device 917 is configured by a display device such as a CRT display device, a liquid crystal display device, a plasma display device, an EL display device or a lamp, an audio output device such as a speaker or a headphone, or a device for visually or auditorily presenting a user with acquired information such as a printer, a cellular phone or a facsimile, for example. The output device 917 outputs results obtained as a result of performing various kinds of processing by the finger vein authentication apparatus 10, for example. Specifically, the display device displays a result obtained by the processing of the finger vein authentication apparatus 10 by a text or an image. The audio output device converts an audio signal containing reproduced audio data, acoustic data or the like into an analog signal and outputs it.

The storage device 919 is a device for data storage that is configured as an example of a storage unit of the finger vein authentication apparatus 10. The storage device 919 may be configured by a magnetic storage device such as a hard disk drive (HDD), a semiconductor storage device, an optical storage device, a magneto-optical storage device or the like. The storage device 919 stores a program to be executed by the CPU 901, various kinds of data, or various kinds of data acquired from the outside, for example.

The drive 921 is a reader/writer for a recording medium, which is built in the finger vein authentication apparatus 10 or attached externally. The drive 921 reads information that is recorded in the removable recording medium 927 such as a magnetic disk, an optical disk, a magneto-optical disk or semiconductor memory which is attached thereto and outputs the information to the RAM 905. Further, the drive 921 can write information into the removable recording medium 927 such as a magnetic disk, an optical disk, a magneto-optical disk or semiconductor memory which is attached thereto. The removable recording medium 927 may be a DVD medium, an HD-DVD medium, a Blu-ray medium, a compact flash (CF) (registered trademark), a memory stick, a secure digital (SD) memory card or the like. Further, the removable recording medium 927 may be an integrated circuit (IC) card or an electronic device incorporating contactless IC chip.

The connection port 923 is a port for directly connecting equipment to the finger vein authentication apparatus 10, such as a universal serial bus (USB) port, an IEEE 1394 port such as i.Link, a small computer system interface (SCSI) port, an RS-232C port, an optical audio terminal, or a high-definition multimedia interface (HDMI) port. By connecting the external connected equipment 929 to the connection port 923, the finger vein authentication apparatus 10 can directly acquire various kinds of data from the external connected equipment 929 or supply various kinds of data to the external connected equipment 929.

The communication device 925 is a communication interface that is configured by a communication device or the like for establishing a connection with a communication network 931, for example. The communication device 925 may be a communication card for wired or wireless local area network (LAN), Bluetooth or wireless USB (WUSB), a router for optical communication, a router for asymmetric digital subscriber line (ADSL) or a modem for various kinds of communications, for example. The communication device 925 can transmit and receive a signal or the like to and from the Internet or another communication device in conformity to a prescribed protocol such as TCP/IP, for example. Further, the communication network 931 that is connected to the communication device 925 is configured by a network or the like connected by wired or wireless means, and it may be the Internet, home LAN, infrared data communication, radio wave communication, satellite communication or the like.

One example of the hardware configuration capable of implementing the functions of the finger vein authentication apparatus 10 according to an embodiment of the present invention is described in the foregoing. Each of the above-described elements may be configured using a general-purpose member or circuit, or it may be configured by hardware specialized to the function of each element. It is thereby possible to change the hardware configuration to use as appropriate according to the technique level when implementing the embodiment.

<Summary>

As described in the foregoing, the finger vein authentication apparatus according to an embodiment of the present invention can specify a relative position of a vein pattern by utilizing a crease pattern existing near the joint even with use of an apparatus where it is difficult to obtain information of a whole finger such as a flat panel using a microlens array. A dermatoglyphic pattern as represented by a crease pattern can be extracted by using characteristics of a spacial frequency of dermatoglyphics.

Further, because the finger vein authentication apparatus according to an embodiment of the present invention can acquire parallax information by using characteristics of a microlens array, it is possible to determine the outer shape of an imaging target and specify a non-living body part, thereby preventing malfunction due to the outline of an imaging target or an imaging background.

Furthermore, because the finger vein authentication apparatus according to an embodiment of the present invention can create a whole image of a vein pattern by using a plurality of vein patterns, it is possible to execute authentication with use of only a part of a registered image.

In addition, because the finger vein authentication apparatus according to an embodiment of the present invention uses a dermatoglyphic pattern as represented by a crease pattern existing near the joint of a finger, it is possible to execute hybrid authentication using both a dermatoglyphic pattern and a vein pattern.

The present application contains subject matter related to that disclosed in Japanese Priority Patent Application JP 2008-253969 filed in the Japan Patent Office on Sep. 30, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A finger vein authentication apparatus comprising:
    a lens array including a plurality of photo-receiving lenses arranged in an array;
    a plurality of near-infrared illumination sources placed along opposed ends of the lens array to illuminate a part of a finger with near-infrared light;
    an image pickup device to create a picked-up image of a vein based on the near-infrared light scattered inside the finger, transmitted through the vein and gathered by the lens array, the image pickup device creating two kinds of picked-up images by performing line scanning in both of a first direction along an alignment direction of the near-infrared illumination sources and a second direction orthogonal to the first direction and along a lengthwise direction of the finger;
    a vein pattern extraction unit to extract vein patterns respectively from the two kinds of picked-up images;
    an authentication unit to authenticate the extracted two kinds of vein patterns; and
    an imaging range detection unit to detect a relative position of an imaging range of the finger by using at least one of a crease pattern near a first joint and a crease pattern near a second joint of the finger existing in at least one of the two kinds of vein patterns.

2. The finger vein authentication apparatus according to claim 1, further comprising:
    a storage unit to store a vein information set including a plurality of vein patterns as a template,
    wherein the authentication unit selects the vein pattern from the vein information set by using at least one of the crease pattern near the first joint and the crease pattern near the second joint.

3. The finger vein authentication apparatus according to claim 2, wherein
    the authentication unit creates a whole image of finger veins by combining the plurality of vein patterns and registering the whole image of finger veins as the template upon registration of the vein pattern, and specifies a part imaged in the vein pattern upon authentication by using at least one of the crease pattern near the first joint and the crease pattern near the second joint.

4. The finger vein authentication apparatus according to claim 1, wherein
    the authentication unit additionally registers an intersection between the crease pattern near the first joint or the crease pattern near the second joint and the vein pattern as a feature point.

5. The finger vein authentication apparatus according to claim 1, wherein
    a plurality of photoreceptors in the image pickup device are allocated to one photo-receiving lens, and
    the finger vein authentication apparatus further comprises:
        a parallax information acquisition unit to acquire information about parallax when imaging a part of the finger by using a plurality of kinds of imaging data obtained by imaging a part of the same finger with use of the plurality of photoreceptors; and
        an outer shape detection unit to detect an outer shape of the finger by using the parallax information.

6. A finger vein authentication method comprising the steps of:
    illuminating a part of a finger with near-infrared light;
    gathering the near-infrared light scattered inside the finger and transmitted through a vein by a lens array including a plurality of photo-receiving lenses arranged in an array;
    creating two kinds of picked-up images by imaging the near-infrared light scattered inside the finger, transmitted through the vein and gathered by the lens array with use of an image pickup device that performs line scanning in both of a direction along a lengthwise direction of the finger and a direction orthogonal to the lengthwise direction of the finger;
    extracting vein patterns respectively from the two kinds of picked-up images;
    detecting a relative position of an imaging range of the finger by using at least one of a crease pattern near a first joint and a crease pattern near a second joint of the finger existing in at least one of the two kinds of vein patterns; and
    authenticating the extracted two kinds of vein patterns.

7. A finger vein authentication apparatus comprising:
    a lens array including a plurality of photo-receiving lenses arranged in an array;
    a plurality of near-infrared illumination sources placed along opposed ends of the lens array to illuminate a part of a finger with near-infrared light;
    an image pickup device to create a picked-up image of a vein based on the near-infrared light scattered inside the finger, transmitted through the vein and gathered by the lens array, the image pickup device creating a picked-up image by performing line scanning in at least one of a first direction along an alignment direction of the near-infrared illumination sources and a second direction orthogonal to the first direction and along a lengthwise direction of the finger;
    a vein pattern extraction unit to extract a vein pattern from the picked-up image;
    an authentication unit to authenticate the extracted vein pattern; and
    an imaging range detection unit to detect a relative position of an imaging range of the finger by using at least one of a crease pattern near a first joint and a crease pattern near a second joint of the finger extracted from the vein pattern.

* * * * *